United States Patent Office 3,340,471
Patented Sept. 5, 1967

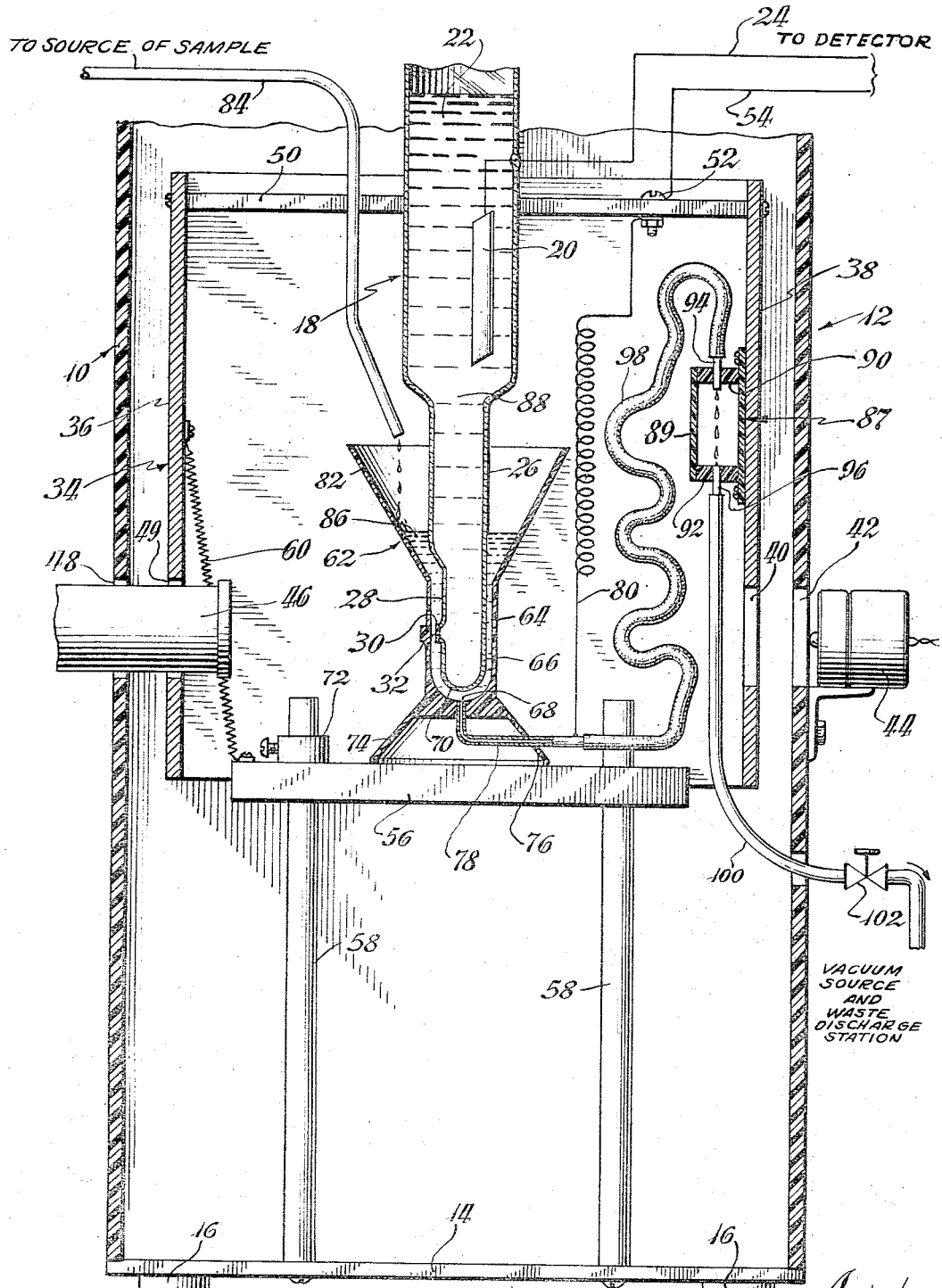

3,340,471
FLOW-THROUGH SAMPLE APPARATUS FOR USE WITH ELECTRICAL PARTICLE STUDY DEVICE
Joseph R. Coulter, Jr., Miami Springs, Fla., assignor to Coulter Electronics, Inc., Hialeah, Fla., a corporation of Illinois
Continuation of application Ser. No. 202,624, June 14, 1962. This application Aug. 22, 1966, Ser. No. 574,250
5 Claims. (Cl. 324—71)

ABSTRACT OF THE DISCLOSURE

Apparatus for enabling the use of the electrical particle study device, known commercially as the Coulter electronic counting device, with a continuous flow of sample suspension; said apparatus including a vessel adapted to receive the lower end of a tube carrying a fine aperture in the wall thereof, said tube being known as a Coulter aperture tube, the lower end of said vessel formed as a hollow cylindrical body and a flared upper end provided as the upper end of said vessel; the lower end of said vessel having drain means provided therein, a metal capillary tube leading from the drain to a conduit of insulating material, a source of vacuum and a drip chamber intermediate the said insulating conduit and said source of vacuum, means for introducing continuous droplets of sample to said vessel; the fluid suspension within the vessel thus being electrically isolated from both the source of sample suspension and the source of vacuum.

---

This application is a continuation of earlier application, Ser. No. 202,624, filed June 14, 1962.

This invention relates generally to means for handling a suspension of particles whereby the particles may be scanned and counted or sized in an electrical particle study device. More specifically, the invention is concerned with flow-through sample apparatus whereby very small quantities of the suspension are continuously passed through the apparatus.

The electrical particle study device with which the invention is concerned is known as the Coulter electronic counting device, the commercial embodiments being familiar to those skilled in the particle field as the apparatus sold under the registered trademark "Coulter Counter" by Coulter Electronics, Inc., of Hialeah, Fla. Of course the device is additionally suitable for use in sizing and making other studies of particles. The particle study device uses a principle of operation which has become universally known as the Coulter principle and is set forth in Coulter U.S. Patent No. 2,656,508, and the fluid metering system and scanning apparatus which has become familiarly associated with the commercial Coulter device is described in U.S. Patent No. 2,869,078.

An important part of the Coulter particle counting device is an elongate tube which is connected into a siphon system and hence, is usually filled with a first body of liquid, such as, for example, a conducting saline solution. An electrode is carried on the interior of the tube, and the tube is disposed in a vessel such as a beaker in which another electrode is suspended. The two electrodes extend to a detecting device. The lower end of the tube has a very small aperture located in its side wall and spaced above the bottom of the tube, this aperture comprising the scanning device of the apparatus since, as the suspension from the beaker is passed through the aperture into the tube, the electrical change caused in the liquid subtended in the aperture is converted into an electrical signal which can be detected. This manner of operation is in accordance with the Coulter principle which asserts that where a particle of microscopic material is suspended in a fluid whose electrical impedance is different from the electrical impedance of the particulate matter, the presence or absence of the particle in a small volume of the fluid may be detected due to the effect of the particle upon the total impedance of the confined volume. The Coulter principle recognizes that the electrical change is a direct function of the volume of the particle passing through the aperture and the duration of the change is the function of the time that the particle has been in the aperture.

The sample which it is desired to study is introduced into the beaker and, according to the operation of the apparatus which has been mentioned in connection with Patent No. 2,869,078, the suspension is sucked through the aperture. The detecting device includes a source of current or voltage which is established across the aperture between the two bodies of fluid on opposite sides of the said aperture. The tube which is known as the aperture tube and the beaker are insulated one from the other so that the only path for the flow of current between the two bodies of fluid must be through the aperture.

In U.S. Patent No. 2,656,508, various proposals concerning the nature of the flow past the scanning aperture were set forth, but practically all of the commercially available Coulter counter devices operate on the basis of a batch method as opposed to a flow-through method.

The technique of using a Coulter device has become well-known. Assuming, for example, that the particles to be counted are blood cells, a known dilution of the blood is made. This is introduced into the beaker as the sample to be tested. The commercially available Coulter devices sold under the trademark "Coulter Counter" and having features described in said U.S. Patent 2,656,508 include what is known as a stand and also includes a tube carrying a fine aperture in the insulating wall forming the tube, the diameter of which is normally chosen to be somewhat larger than the largest diameter of particle it is expected to encounter. This tube has become known to those skilled in this art as a Coulter aperture tube or simply an aperture tube. The stand has means for fixedly supporting the aperture tube and the various electrical manometric and other paraphernalia associated with the aperture tube as well as a movable platform springloaded to engage against the bottom of the aperture tube. The technician manually pulls the platform down, places the beaker with the sample suspension on the platform and permits the platform to raise the beaker against the bottom of the aperture tube. The aperture is located in the side wall of the tube spaced somewhat above the bottom to avoid the adverse statistical effects of sedimentation and because it is more practical to flatten a side wall of the tube and apply an accurately sized wafer as, for example, in accordance with the construction of U.S. Patent No. 2,985,830 a presently practical and commercially available aperture tube of the character concerned.

Thereafter the process consists of using the manometer syphon to draw a predetermined quantity of the suspension through the wafer and into the interior of the aperture tube. While this is occurring the signal produced in the aperture is detached and used to energize counters, recorders, rate meters or the like. When the determination has been completed and perhaps several runs of the same sample have been made, the technician lowers the platform and discards the sample suspension. The beaker is carefully washed and ready for another sample solution. Obviously, when a large number of determinations are being made, a large number of beakers are used. Since the technique calls for sucking suspension through the aperture into the interior of the aperture tube, there is, of course, no need to flush or clean the aperture tube unless sedimentation at the bottom thereof becomes so heavy that sedimentation particles will effect the count or the signals received.

The signals which are produced in the passage of particles through the aperture arise by virtue of a change in the impedance of the liquid subtended substantially within the aperture. There will be one signal for each particle, and that signal, as has been found, will have an intensity almost directly related to the solid volume of the particle.

Early in the development of the devices utilizing the Coulter principle, it was found that the scanning portion of the apparatus, that is is the portion that was related to the aperture and the bodies of fluid, was quite sensitive to extraneous interference signals. Spurious counts representing noise, hum and the like would render ineffectual the operation of the device unless means were employed to eliminate this. Accordingly, the stand, which has been mentioned above, included shielding around the aperture and the suspension in the beaker was carefully insulated from any capacitive connections or direct connections to other apparatus. Where the impedance of the circuit connected across the aperture increased, the likelihood of noise, hum and interference also increased.

It has been observed that the Coulter device would have great utility in connection with samples which are continuously flowing through the apparatus. Since the so-called Coulter principle of partial detection calls for the suspension sample to be conducting, it was found that the elongation of the conducting arm of the suspension in a vessel taking the place of the breaker was an invitation to interference and hum pickup. Such elongation, of course, is provided by conduits carrying the fluid to the sample vessel from the source of suspension and likewise from the sample vessel.

The primary object of the invention is to provide apparatus whereby the devices utilizing the Coulter principle of particle study may be adapted for use with flow-through samples without giving rise to the pickup of hum, extraneous signals and noise, and especially to provide such apparatus where the quantities of flow-through samples handled are low.

Other objects are concerned with the simplicity, economy, convenience and efficiency of the apparatus.

Other objects and advantages will occur to those skilled in the art to which this invention appertains as a description of a preferred embodiment is set forth in connection with the single figure comprising a generally diagrammatic sectional view through apparatus constructed in accordance with the invention.

The invention generally is characterized by providing a sample vessel in which an aperture tube such as those disclosed in U.S. Patents 2,656,508, 2,869,078 and 2,985,830, is disposed having a drip chamber in its outlet, the dimensions of which are such that the fluid passing through the drip chamber continuously interrupts any possible conducting path extending from the sample in the vessel outside of the immediate vicinity of the aperture tube of the Coulter device.

Referring now to the drawing, there is illustrated in the said drawing a portion of the stand of a commercially available Coulter device sold under the registered trademark "Coulter Counter" by Coulter Electronics, Inc. of Hialeah, Fla., which is of usual construction with the exception of the flow-through apparatus that is associated therewith. The stand is illustrated in generally a diagrammatic manner and, as shown, there is a pair of side members 10 and 12 supported on a suitable base 14 that may have cushioned feet at 16. In the commercial structure, the frame members 10 and 12 are usually formed of some insulating material, such as clear plastic, so that the interior may readily be visible. Support is provided on the stand for the tube 18, only the lower portion of which is shown, said tube 18 carrying the fine aperture such as disclosed in the aforesaid U.S. patents and which will hereafter be referred to as an aperture tube or the aperture tube. As conventional, the aperture tube has an electrode 20 immersed in the body of fluid 22 contained within the tube, and the electrode connects by way of the lead 24 to the detector. The bottom end of the tube 18 is usually of smaller diameter as shown at 26 and normally has a flattened portion 28 upon which the scanning element or annular wafer 30 is secured. The aperture in the wafer 30 is normally not visible to the naked eye but will be referred to herein by the reference character 32.

The area in which the aperture tube 18 is suspended is normally surrounded by a metal shield 34, the side walls 36 and 38 of which are shown. Aligned openings 40 and 42 in the side plates 38 and 12 respectively enable light from a simple projector 44 to pass through the bottom end of the aperture tube 18 illuminating the aperture 32 so that a microscope, a portion of which is shown at 46, may view the aperture to inspect the same to enable the technician to know whether debris has plugged the same. The portion 46 of the microscope extends through aligned openings 48 and 49 in the side members 10 and 36, respectively.

Conveniently, a bracing bar 50 extends between the side plates 36 and 38, said bar 50 being of insulating material and having a terminal 52 which is connected to the detector by way of the lead 54.

Ordinarily, there is a platform 56 which is adapted for vertical movement, for example, on guide rods 58, and the said platform 56 being urged upwardly by spring means, symbolically illustrated at 60.

In carrying out a particle analysis in accordance with the utilization of the Coulter principle of particle study using the commercially available apparatus which has been described above, one places the sample in a simple beaker (not shown) upon the platform 56 and permits the spring 60 to pull the beaker up against the bottom end of the aperture tube 18 after which the determination is made.

In accordance with the invention herein, the bottom end of the vessel 62 in which the sample is disposed is provided with a drain that is attached to a source of vacuum. The continuously flowing sample is introduced through the top of the vessel 62 while continuously being drawn off through the bottom. Determinations may be made using the manometric technique described in said Coulter Patent No. 2,869,078 in which case runs are made giving a count and/or information as to size for one batch after another while the sample continuously flows through the vessel. On the other hand, where size information is all that is required or it is desired continuously to count the particles for population, rate, etc., there may be a continuous sucking of suspension through the aperture 32 to the interior of the aperture tube 18 while the sample is continuously flowed through the sample vessel.

Since continuous flow-through samples will usually be of very low volumes, there is illustrated in the figure a vessel designated generally 62 which is in the form of a generally cylindrical body portion 64 providing on its interior a chamber 66 which is not much greater in size and of the approximate configuraiton as the bottom end of the aperture tube 18. There is a drain opening at the bottom of the chamber 66 as shown at 68, and means may be provided so that when the platform 56 moves the vessel 62 upward, the bottom end 70 of the aperture tube will not close off the drain opening 68. In the particular structure shown there may be a collar 72 secured to one of the guide rods 58 to limit upward movement of the platform 56.

The vessel 62 has a suitable base or pedestal 74 which is hollow and which has a side opening 76 through which a drain tube 78 extends. The drain tube 78 is of L configuration, and it has one end inserted in the drain opening 68 and the other end extending outside the pedestal 74 through the side opening 76. This drain tube 78 is made of metal and is of capillary dimensions. There is an electrical lead 80 connected from the end of the drain tube 78 to the terminal 52 of such length as to enable the platform 56 freely to be lowered without breaking the lead 80 or limiting the movement of he platform 56.

The upper end of the vessel 62 is flared to a funnel configuration as shown at 82 to enable introduction of the sample fluid thereinto. As shown, there is a conduit 84 which leads the sample fluid to the vessel 62 and a body of such sample fluid is shown in the vessel at 86. Obviously particles in suspension in the body of fluid 86 will pass through the aperture 32 to the body of fluid 88 in the interior of the aperture tube 18.

In leading the sample fluid to the body of fluid 86 by way of the conduit 84, the rate of flow may be adjusted so that there is a continuous dripping as shown whereby the fluid in the tube 84 is never electrically connected with the body 86.

With respect to the draining of fluid from the body 86, it will be noted that there is a drip chamber designated generally 87 mounted on the interior of the side wall 38 which is intended to break up the flow of discharge liquid to prevent electrical connection between the said body of fluid 86 and the discharge fluid.

The drip chamber 87 consists of a tubular member 89 of insulating material having top and bottom plugs 90 and 92 through which short conduits 94 and 96, respectively, extend. The conduit 94 connects by way of a flexible tube 98 to the drain tube 78 and is of such length and configuration as to enable free movement of the platform 56 up and down. The bottom conduit 96 is connected to a pipe 100 which, in turn, extends to a source of vacuum and a waste container through the valve 102. When the vacuum is permitted to draw the fluid from the body 86, it will pass through the tube 98, the drip chamber 87 and into the conduit 100. The size of the passageways in the tubing and conduits is such that the fluid will be dripping by discrete drops through the drip chamber 87 and thereby there will be no electrical connection between that fluid which is within the tube 98 and that fluid which is in the tube 100.

It will be obvious that when the rate of flow is properly adjusted, there will be no electrical connection between the body of fluid 86 and any possible extension thereof which might give rise to interference, hum and noise.

It should be mentioned in passing that the voltages encountered in using the apparatus of the character described herein and referred to in the aforementioned United States patents, are often high enough to cause elecrtical shock. The invention herein likewise prevents electrical shock to anyone handling the various parts of the apparatus by insulating the sample vessel 62 from either the incoming or outgoing liquid.

It is believed that the invention should be fully understood without further explanation, and it is pointed out that considerable variation may be made without departing from the spirit or scope of the invention as defined in the appended claims.

What it is desired to secure by Letters Patent of the United States is:

1. In a particle study device in which a suspension of particles is passed through an aperture from a first vessel to a second vessel, the aperture being provided in a wall of said second vessel, in which each vessel has a fluid body therein electrically insulated one from the other except through said aperture, in which the second vessel is at least partially immersed in the first body of fluid of the first vessel with the aperture below the level of said first body of fluid, in which the first body of fluid is a sample suspension, in which an electric current is established through said aperture and in which means are provided to detect signals generated by passage of particles though said aperture; the invention consisting of apparatus; the invention consisting of apparatus for enabling a continuous flow of sample suspension from a source thereof through said first vessel to a discharge station which includes a vacuum source and is located remote from the first vessel while using said device and while maintaining said first body fluid electrically isolated from both the source of sample suspension and the discharge station and comprising, inlet conduit means leading a continuously flowing stream of sample suspension thereto from the source thereof to the first vessel, said inlet conduit means having a discharge end arranged in the vicinity of the first vessel to introduce the stream of sample suspension to the first vessel in the form of successively flowing discrete elements, and outlet conduit means leading fluid suspension from said first vessel to said discharge station, flow interrupting means arranged communicating with the outlet conduit means in the vicinity of the first vessel for forming successively flowing discrete elements, said flow interrupting means comprising a drip chamber having an entrance and an exit spaced one from the other and said chamber being interposed in the flow path of the fluid suspension from the first vessel to the discharge station for leading said fluid suspension into the chamber through the entrance thereto to form the plurality of successively flowing discrete elements, each of which is discharged through the exit to the discharge station at the location thereof remote from the first vessel.

2. Apparatus as claimed in claim 1 in which said outlet conduit means includes a conducting drain member connected in the bottom of said first vessel and means are provided for extending an electrical connection from said drain member to the detecting means of the particle study device.

3. Apparatus as claimed in claim 1 in which there is an electrical conducting member interposed between said first vessel and said drip chamber.

4. Apparatus as claimed in claim 1 in which drain means are provided at the bottom of said first vessel and said outlet conduit means is connected thereto, said suspension being introduced into the top of said first vessel and drained at the bottom thereof.

5. Apparatus as claimed in claim 4 in which a portion of said outlet conduit means connected to said drain means is electrically conductive and means are provided for extending an electrical connection from said portion to the detecting means of the particle study device.

References Cited

UNITED STATES PATENTS 3,165,692   1/1965   Isreeli et al.
3,165,693   1/1965   Isreeli et al.

RUDOLPH V. ROLINEC, *Primary Examiner.*

C. F. ROBERTS, *Examiner.*

UNITED STATES PATENT OFFICE

CERTIFICATE OF CORRECTION

Patent No. 3,340,471                      September 5, 1967

Joseph R. Coulter, Jr.

It is hereby certified that error appears in the above numbered patent requiring correction and that the said Letters Patent should read as corrected below.

Column 3, line 25, for "partial" read -- particle --; column 6, lines 7 and 8, strike out "the invention consisting of apparatus;".

Signed and sealed this 27th day of August 1968.

(SEAL)

Attest:

Edward M. Fletcher, Jr.
Attesting Officer

EDWARD J. BRENNER
Commissioner of Patents